United States Patent

[11] 3,552,302

| [72] | Inventor | Samuel L. Gilberg |
| | | 7045 Cornell, University City, Mo. 63130 |
| [21] | Appl. No. | 764,888 |
| [22] | Filed | Oct. 3, 1968 |
| [45] | Patented | Jan. 5, 1971 |

[54] BARBECUE GRILL
4 Claims, 6 Drawing Figs.

[52] U.S. Cl. .................................................. 99/444,
  99/450; 126/25
[51] Int. Cl. ...................................................... A47j 37/07
[50] Field of Search ........................................ 99/444,
  339, 422, 425, 426, 450; 126/9, 11, 25, 29, 30

[56] References Cited
UNITED STATES PATENTS

| 1,748,741 | 2/1930 | Tanaki | 99/450X |
| 1,913,337 | 6/1933 | Manicke | 99/450 |
| 2,384,847 | 9/1945 | Perry | 99/450 |
| 2,923,229 | 2/1960 | Halford | 126/25(A)X |

Primary Examiner—Walter A. Scheel
Assistant Examiner—Arthur O. Henderson
Attorney—Cohn and Powell ABSTRACT: The grill is of the type supported over an open fire, and includes a plate having a continuous rim and a plurality of slits, interiorly of the rim, perforating the plate. The slits are of a size to admit smoke, exclude flame and allow the drainage of grease. Each slit is provided with downwardly depending, integral siffening flanges forming the elongate margins of the slit. The stiffening flanges are oriented to reinforce the grill in two directions.

PATENTED JAN 5 1971

3,552,302

Inventor
SAMUEL L. GILBERG

By Cohn and Powell
Attorneys

3,552,302

BARBECUE GRILL

BACKGROUND OF THE INVENTION

This invention refers in general to an open barbecue grill used for cooking food products over a direct flame and in particular, to a grill formed from a perforated plate and suitable for cooking small items.

The most common type of barbecue grill is that provided by a framework of metal bars or wires which are supported over a pit or other fuel-containing structure. This form of grill is suitable for cooking fairly large food products, such as steaks, pork chops and the like. Smaller items are likely to fall through the bars into the fire.

Obviously, it is possible to cook smaller objects in a pan, such as a frying pan, but there is considerable disadvantage in doing this. The cooking of items requiring grease and those forming their own grease results in a residual pool of grease collecting at the bottom of the pan. Continued application of heat to a quantity of grease such as this invariably results in a grease fire. Obviously, this is a dangerous and undesirable situation.

The use of a pan as described above is not efficacious in providing the smoked flavor which is considered so desirable in barbecue cooking. Further, there is a distinct problem in pan cooking in that the food products tend to be greasy.

SUMMARY OF THE INVENTION

The grill of the present invention is particularly suitable for the barbecuing of small meat products and vegetables because it offers a large support area. It is, for example, eminently suitable for the preparation at one time of a variety of small food products in what is known as the "Mongolian" style cooking, as well as kabobs without the need for skewers.

The slits provided in this grill afford excellent drainage and preclude the collection of grease to a depth sufficient to cause a flash fire.

By providing the slits with depending flanges, the grill as a whole, is reinforced. Moreover, although smoke can find its way upwardly through the grill, the slits are not sufficiently wide to permit the entry of flame and such entry is further precluded by the baffle effect of the marginal flanges.

The grill includes a plate having a rim and plurality of perforations being of a size to admit smoke, exclude flame and allow the drainage of grease. The perforations are slit-shaped. Each slit includes downwardly depending stiffening flanges providing the elongate margins, the flanges being formed from the plate material. The elongate margins are rounded downwardly to facilitate the collection and disposal of the grease.

The plate is substantially rectangular in configuration, and the rim is raised to form a shallow pan. The slits are diagonally oriented so that the stiffening flanges provide two-way reinforcement for the plate.

The slits are less than approximately one-tenth of an inch wide and have a length to width ratio of not less than three.

DESCRIPTION OF THE PREFERRED EMBODIMENT

Figure 1:
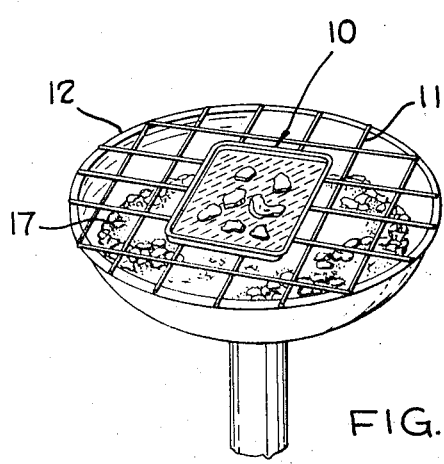
FIG. 1 is a fragmentary perspective view illustrating the grill supported by a conventional barbecue stand.
Figure 2:
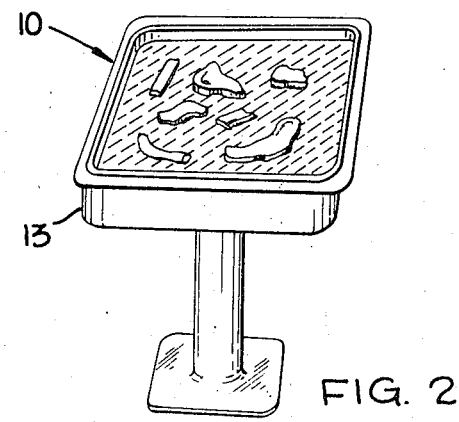
FIG. 2 is a perspective view of an alternative arrangement of the grill supported by its own fuel receptacle.

Referring now by characters of reference to the drawing and first to FIGS. 1 and 2, it will be understood that the grill 10 may be supported on a conventional barbecue grid 11, and so disposed over a fuel receptacle 12 above a fuel bed 17. Alternatively, the grill 10 may be supported by its own compatible fuel receptacle 13 as illustrated in FIG. 2.

Figure 4:
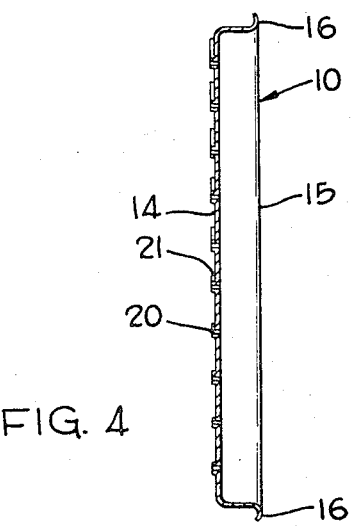
FIG. 4 is a cross-sectional view as taken on line 4-4 of FIG. 3.
Figure 3:
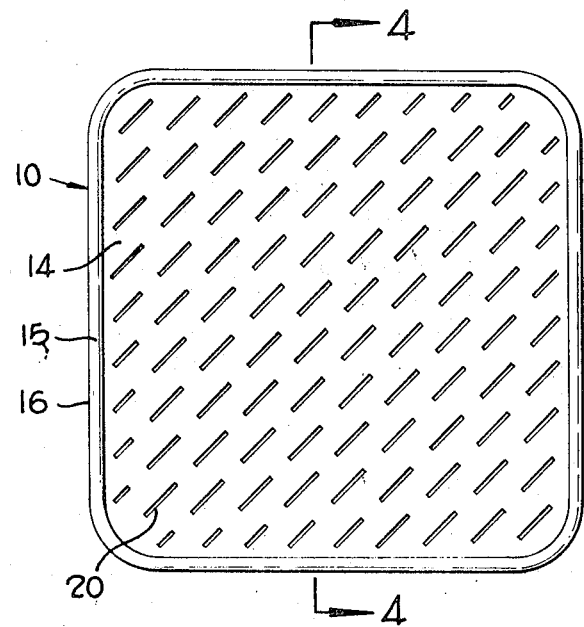
FIG. 3 is an enlarged plan view of the grill.

Turning now to FIGS. 3 and 4, which illustrate the grill 10 itself in greater detail, it will be clear that the grill 10 includes a plate 14 providing a panel substantially rectangular in configuration and having a continuous, raised rim 15. The rim 15 is provided with an outwardly turned lip portion 16 which is adapted to support the plate over the flame in an embodiment such as illustrated in FIG. 2.

The plate 14 includes a plurality of slits 20 constituting perforations of a size to admit smoke, exclude flame and allow the drainage of grease. It has been discovered that these slits 20, in order to perform effectively the function ascribed to them, should not be too large. An opening of a width not more than one-tenth of an inch and having a length of at least three times the width has been found to perform satisfactorily.

Figure 5:
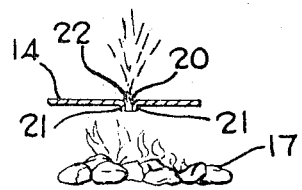
FIG. 5 is a fragmentary enlarged detail of a slit illustrating the flanges, and adjacent the perforations.
Figure 6:
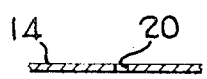
FIG. 6 is a similar detail of a slit without the flanges.

As is most clearly shown in FIGS. 4 and 5, each slit 20 includes downwardly depending stiffening flanges 21. These flanges 21 provide the elongate margins of the slit 20 and are formed from the material of the plate 14. This material is preferably thin steel or aluminum. The integral nature of the flanges 21 with the plate 14 is clearly illustrated in FIG. 5.

The formation of the slits 20 may be accomplished by means of a knife edge or other instrumentality. When the slits 20 are formed in this fashion, the pressure necessary to cut the metal results in a rounded edge 22 at the conjunction of the plate 14 and the integral flanges 21 such that the flanges 21 are rounded downwardly from the plate. This configuration facilitates the collection and disposal of grease and may also depress the area in the vicinity of the slit 21 slightly below the general level of plate 14 which further facilitates the collection and disposal problem. Of course, this depressed and rounded structure could also be formed by pressing or stamping the sheet metal. The rounded edges 22 flanking the slit 20 are clearly shown in FIG. 5.

The downwardly depending flanges 21 which flank each slit 20 provide a significant strengthening feature to the panel-like plate 14 forming the bottom of the grill. This feature is particularly useful when the grill is formed from a shallow pan of sheet aluminum or sheet steel and provides a rigidity otherwise not available in a pan of this type. The reason for this, of course, is that the flanges 21 act as reinforcing rib members which impart considerable structural strength to the panel 14. In the embodiments of the invention which utilize flanged slits 20, it is a distinct advantage, particularly when the grill has a rectangular configuration, to orient the slits 20 diagonally. Such diagonal orientation provides rib strengthening in both lateral and longitudinal directions. The slits 20 of each diagonally arranged row are relatively, longitudinally spaced. Moreover, the slits 20 of each row are longitudinally displaced relative to corresponding slits 20 of each laterally adjacent row so that each slit of each row is located directly opposite the space between longitudinally adjacent slits of each adjacent row. This structural arrangement strengthens the panel along a line transverse to the rows. This is particularly useful in the event that the grill is to be self-supporting.

It is thought that the structural features and functional advantages of this grill 10 have become fully apparent from the foregoing description of parts, but for completeness of disclosure, the operation and a method of constructing the grill will be briefly described.

The grill 10 may be pressed from a sheet of aluminum or steel and the slits 20 may be formed at the same time. Alternatively, the slits 20 may be formed in an a aluminum tray such as is commonly used as a container for frozen foods and other packaged foodstuffs. In this context, one of the distinct advantages of the present invention is that foodstuffs may be packaged in an aluminum tray already provided with the slits 20 and ready for immediate cooking in the tray.

Generally speaking, the provision of a continuous rim 15 and stiffening flanges 21 are desirable and improve the construction of the grill 10. The slits 20 may be stamped into the plate 14 or they may be cut into the material of the plate 14 by means of a wedged instrument such as a point or knife edge. When the slitting operation is accomplished by downward pressure against small resistance, the result is that the panel material is deformed into downwardly depending flanges 21 flanking each slit 20.

In use, the grill may be placed on a conventional barbecue grid 11, such as shown in FIG. 1, or it may be supported by its own fuel receptacle as shown in FIG. 2. In any event, the grill 10 is disposed above a fuel bed 17.

Grease which collects in the bottom of the shallow grill 10 is drained through the slits 20, the grease falling onto the fire below in the form of drips which are not susceptible to serious flareup. The area and configuration of the slits 20 are not large enough to allow the upward passage of flame from the fuel bed 17, although, as shown in FIG. 5, smoke will pass upwards to provide the foodstuffs with the smoked flavor which enhances its taste.

Further, when downwardly depending flanges 21 are provided flanking the slits 20, as indicated in FIG. 5, there is a baffle effect which assists in inhibiting the passage of flame through the slits 20. On the other hand, smoke is not excluded by the flanges 21 and may even be assisted in its upward passage by a forced draft created by the chimney effect of the side flanges 21. In addition, the grease may build up a small head in the flanges slit orifice thereby facilitating its downward movement.

The grill is not, of course, limited to a rectangular configuration. It may be circular as indeed many foodstuff packaging trays are. In the event that a circular grill be desired, it is advantageous to form the elongate slits in a plurality of adjacently disposed concentric circular rows or, alternatively, in a plurality of adjacently disposed radial rows emanating from the center of the grill.

As is the case with a grill of rectangular configuration, a superior rib stiffening effect is obtained when slits of adjacent rows are disposed in staggered relation.

I claim:

1. A barbecue grill of the type supported over a flame, comprising:
   a. a plate adapted to hold food products over the flame, the plate having a rim and a plurality of perforations interiorally of the rim, the perforations being of a size to admit smoke, exclude flame and allow the drainage of grease;
   b. the plate having opposite sides;
   c. the perforations being elongate slits arranged in spaced, substantially parallel rows diagonally oriented to the plate sides, the slits of each row being longitudinally spaced; and
   d. the slits of each row being longitudinally displaced relative to corresponding slits of each laterally adjacent row so that each slit of each row is located directly opposite the space between longitudinally adjacent slits of each adjacent row.

2. A barbecue grill of the type supported over a flame, comprising:
   a. a plate adapted to hold food products over the flame, the plate having a rim and a plurality of perforations interiorally of the rim, the perforations being of a size to admit smoke, exclude flame and allow the drainage of grease;
   b. the perforations have an elongate, open-slit configuration; and
   c. the elongate slits having margins that are rounded downwardly from the plate to facilitate the collection and disposal of the grease.

3. A barbecue grill of the type supported over a flame, comprising:
   a. a plate adapted to hold food products over the flame, the plate having a rim and a plurality of perforations interiorally of the rim, the perforations being of a size to admit smoke, exclude flame and allow the drainage of grease;
   b. the perforations have an elongate, open-slit configuration;
   c. the plate being substantially rectangular in configuration;
   d. the slits including opposed downwardly depending stiffening flanges formed from the plate flanking the slit; and
   e. the slits and stiffening flanges being diagonally oriented relative to the sides of the rectangle to stiffen the plate longitudinally and laterally.

4. A grill as defined in claim 3, in which:
   f. the slits are arranged in spaced, substantially parallel rows, the slits of each row being longitudinally spaced; and
   g. the slits of each row are longitudinally displaced relative to corresponding slits of each laterally adjacent row so that each slit of each row is located directly opposite the space between longitudinally adjacent slits of each adjacent row.